United States Patent
Menard et al.

(10) Patent No.: US 7,869,444 B2
(45) Date of Patent: Jan. 11, 2011

(54) MIXED WIRELESS AND CABLED DATA ACQUISITION NETWORK

(75) Inventors: Jean-Paul Menard, Pornic (FR); Daniel Pennec, Suce sur Erdre (FR); Dominique Deniau, Suce sur Erdre (FR); Jean-Luc Dronet, Vigneux de Bretagne (FR)

(73) Assignee: Sercel, Carquefou (FR)

( * ) Notice: Subject to any disclaimer, the term of this patent is extended or adjusted under 35 U.S.C. 154(b) by 674 days.

(21) Appl. No.: 11/262,956

(22) Filed: Nov. 1, 2005

(65) Prior Publication Data

US 2007/0025307 A1 Feb. 1, 2007

(30) Foreign Application Priority Data

Jul. 28, 2005 (FR) .................................. 05 08070

(51) Int. Cl.
*H04L 12/28* (2006.01)
(52) U.S. Cl. ...................... 370/400; 455/555
(58) Field of Classification Search ............... 370/338, 370/400; 455/555, 446, 524
See application file for complete search history.

(56) References Cited

U.S. PATENT DOCUMENTS

| 4,583,206 A | | 4/1986 | Rialan et al. |
| 4,891,694 A | * | 1/1990 | Way ........................... 725/114 |
| 5,454,037 A | * | 9/1995 | Pacella ...................... 379/453 |
| 2002/0065058 A1 | | 5/2002 | Gatherer et al. |
| 2002/0174441 A1 | * | 11/2002 | Marin et al. ................ 725/114 |
| 2005/0130701 A1 | * | 6/2005 | Zendle ....................... 455/555 |
| 2006/0291327 A1 | * | 12/2006 | Barakat ....................... 367/14 |

FOREIGN PATENT DOCUMENTS

| EP | 1 401 150 A2 | 3/2004 |
| FR | 2 511 772 | 2/1983 |

* cited by examiner

*Primary Examiner*—Robert W Wilson
*Assistant Examiner*—Wei Zhao
(74) *Attorney, Agent, or Firm*—Fulbright & Jaworski, L.L.P.

(57) ABSTRACT

A data acquisition network includes an assembly of nodes including at least one wireless network of nodes in which two neighboring nodes transmit data between each other by radio waves. The assembly of nodes also includes at least one other network of nodes in which two neighboring nodes transmit data between each other by a cable. The data is also conveyed by radio waves. The at least one other network forms a cabled network of nodes.

20 Claims, 2 Drawing Sheets

MIXED WIRELESS AND CABLED DATA ACQUISITION NETWORK

BACKGROUND OF THE INVENTION

The invention relates to a data acquisition network formed of nodes and in which some nodes exchange data by wireless link, other nodes exchanging data by wire or cabled link.

The invention relates in particular to a network in which the nodes are formed of seismic sensors.

The invention also relates to a seismic sensor comprising means for sending and receiving data by wireless link and/or by wire link.

The present invention applies in particular in the field of oil exploration. In this field of application, seismic sensors, disposed on the earth's surface, are used to receive the echoes of waves emitted into the ground by a seismic source. A processing of these echoes makes it possible to construct a map of the explored sub-surface.

The invention is not however limited to the particular field of oil exploration and may be applied to any field implementing a data acquisition network in which the data acquired by each of the nodes of the network are sent and received by other nodes by wireless link and/or by wire link.

The person skilled in the art is aware of numerous devices implementing a data acquisition network.

In the case where the data acquisition network is formed of an assembly of seismic sensors, these devices are conventionally and usually constituted by sensors linked together in groups to a "node" of the network, by means of wires or cables. These nodes are generally organized in groups around a "concentrator", a group of nodes forms, with its concentrator, a subnetwork, the links between the concentrator and the nodes likewise being wire links. The concentrators locally manage the subnetwork of nodes, provide the energy supply for the nodes and centralize the data. The concentrators are connected to a local computer network, likewise a wire network, to which is connected a Central Unit which drives the assembly and records the data originating from the subnetworks.

These conventional solutions are well known to the person skilled in the art and will not be described in detail hereinbelow. These solutions have the drawback of requiring a significant quantity of cables and associated lengths of cables, cables difficult to move and to deploy on an operating site.

Networks for acquiring data by wireless link (RF) have therefore been proposed, in particular for seismic applications, since they have numerous advantages. Wireless networks of seismic sensors are networks whose nodes are equipped with at least one sensor. The data acquired at the level of each of the nodes are transmitted at low power so as to reach at least one neighboring node, which serves as relay to reach another neighboring node and so on and so forth until the data reach their destination, which is generally the concentrator. This technique is called the multi-hop technique.

The wireless communication from one node to another of the network can in certain cases be difficult or even impossible.

By way of nonlimiting examples, the following causes for which wireless communication between two nodes of the network is difficult or even impossible may be cited:

Multipaths: the RF waves are reflected off the surrounding obstacles and the antenna of a sensor of the receiver node may be located at a spot where the sum of the RF waves is close to zero;

The topology of the terrain: a large difference in altitude between two neighboring nodes of the network may mask the RF beam (canyon, cliff, etc.);

Vegetation: bushes, dense areas of plants;

Damp, flooded or floodable areas (the RF waves do not propagate in water): marshes, areas prone to tides;

Buried sensors (happens in some cases): a buried antenna is very insensitive;

Jammers: the proximity of transmitters in the same frequency bands (same radio band) or in nearby bands may render the radio messages sent and received between two nodes of the network totally undecodable.

The nodes of these wireless networks are customarily equipped with a single antenna used alternately for receiving and sending the data acquired. With a single antenna, the data transmission problems cited herein-above are even more acute.

Document FR 2511772 proposes that this type of data transmission problem be solved with a device performing the sequential transmission of the data between a central system for control and recording of the data (concentrator) and a plurality of data acquisition apparatuses (seismic sensors forming a node) by wireless transmission (RF waves) and by wire transmission (cables).

Thus, in the areas where the transmission of the data by RF waves is difficult or even impossible, the RF waves transmission of the data is substituted by wire transmission. To do this, each data acquisition apparatus is furnished with a system for automatic switching to one or the other of the functionalities, RF waves or cable.

To transmit the data by RF waves or by cables, it is necessary to implement two different protocols for data transmission depending on whether one or the other of the means of transmission is employed. This necessity is related in particular to the considerable distances which may exist between a data acquisition apparatus and the central system. Moreover, these different protocols use distinct hardware means. This device therefore proposes a solution which is complex and expensive.

Networks for data acquisition by wireless link and in particular wireless networks of seismic sensors using a multi-hop technique must be improved.

SUMMARY OF THE INVENTION

This aim is achieved within the framework of the present invention by virtue of a data acquisition network comprising an assembly of nodes itself comprising at least one wireless network of nodes in which two neighboring nodes transmit data between them which are conveyed by radio waves, characterized in that it comprises at least one other network of nodes in which two neighboring nodes transmit data between them by means of a cable, in which the data are also conveyed by radio waves, said at least one other network thus forming a cabled network of nodes.

BRIEF DESCRIPTION OF THE DRAWINGS

Other characteristics, aims and advantages of the present invention will become apparent on reading the detailed description which follows, and in conjunction with the appended drawings, given by way of nonlimiting examples and in which.

DETAILED DESCRIPTION OF THE INVENTION

Figure 1:
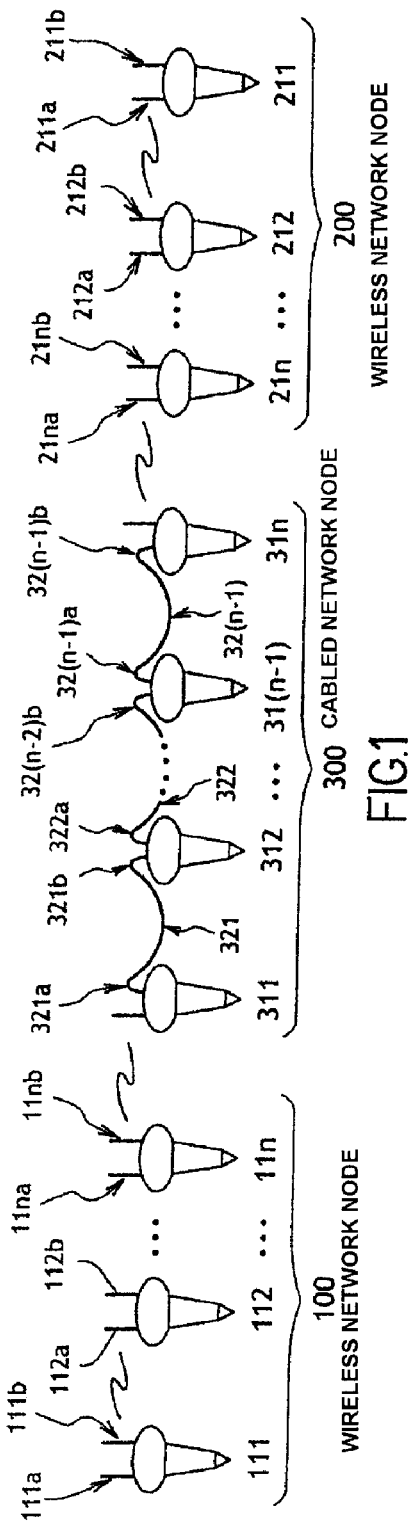
FIG. 1 shows a data acquisition network in accordance with the present invention according to an embodiment of the invention.

FIG. 1 shows a data acquisition network in accordance with the present invention, realized according to an embodiment of the invention, and in which said network is formed of an assembly of nodes, this assembly of nodes itself comprising at least one wireless network of nodes 100, 200 formed respectively of the nodes 111, 112, . . . , 11n and 211, 212, . . . , 21n, in which two neighboring nodes of said network 100, 200 communicate with one another by RF. This assembly of nodes also comprises at least one other network of nodes 300 formed of the nodes 311, 312, . . . , 31n in which two successive nodes of said network 300 transmit data between them by means of a cable 321, 322, . . . , 32(n-1) thus forming a cabled network of nodes.

A wireless network of nodes 100, 200 is formed of nodes, each of them respectively comprising at least two antennas (111a, 111b), (112a, 112b), . . . , (11na, 11nb) and (211a, 211b), (212a, 212b), . . . , (21na, 21nb).

The antennas of one and the same node of the wireless networks 100, 200 are coupled electrically by means of a coupler (not represented), thereby making it possible to reduce the probability of extinction of the signal received while affording spatial diversity both at the sending and at the receiving. In place of the electrical coupling envisaged between the two antennas, it is possible, according to an alternative embodiment, to use an antenna switch (not represented) which makes it possible to choose one or the other of the two antennas at the transmission and at the receiving, as a function of the quality of the link measured on each antenna.

The cabled network of nodes 300 is formed of an assembly of nodes 311, 312, . . . , 31(n-1), 31n which are disposed successively. The nodes 311 and 31n make it possible respectively to perform a relay between, on the one hand, the wireless network of nodes 100 and the cabled network of nodes 300, and, on the other hand, between the wireless network of nodes 200 and the cabled network of nodes 300.

The protocol used to transmit the data within the cabled network of nodes 300 is the same as that used within the wireless networks of nodes 100 and 200, namely a radio-type protocol. In a more general manner, the wireless networks of nodes 100, 200 transmit data between nodes which are conveyed by a radio wave. When these data arrive at the input of the cabled network of nodes 300, the data originating from a wireless network of nodes 100, 200 are still conveyed by this radio wave, which now propagates in a cable rather than by RF. The transmission of the data by radio waves within the cabled network of nodes is possible since the distance between two neighboring nodes of the cabled network of nodes is small.

The nodes 311 and 31n, located at the ends of the cabled network of nodes 300, are both formed on the basis of a node comprising at least two antennas and of which one at least of these antennas, which is removable, is mounted on a means of fixing able to receive a cable end. Stated otherwise, these nodes 311 and 31n are nodes in accordance with the nodes used in the wireless networks of nodes 100 and 200, except for the difference that at least one of the antennas is removable, so that a cable can be plugged into the means of fixing provided in the node 311, 31n.

The nodes 312 to 31(n-1) of the cabled network of nodes 300 are for their part formed on the basis of a node comprising at least two antennas and of which two at least of these antennas, which are removable, are mounted on respective means of fixing able to receive cable ends 321a, 321b, 322a, . . . , 32(n-2)b, 32(n-1)a, 32(n-1)b respectively. These nodes 312 to 31(n-1) are in accordance with the nodes used in the wireless networks of nodes 100, 200 except for the difference that the two antennas are mounted on a means of fixing in a removable manner.

The successive nodes 311, 312, . . . , 31n of the cabled network of nodes 300 are linked together in pairs by the cables 321, 322, . . . , 32(n-1) respectively, cables which are fixed by their respective ends (321a, 321b), 322a, . . . , 32(n-2)b, (32(n-1)a, 32(n-1)b), instead of the antennas, to the fixing means provided for this purpose.

The use of a radio protocol for the networks of nodes 100, 200, like the cabled network of nodes 300, is possible insofar as the distance separating two successive nodes of the cabled network of nodes 300 is small. Specifically, the attenuation curve for the radio waves is very favorable to waveguides over short distances. It is therefore not necessary to provide for a cable-specific data transmission protocol, and by the same token to provide specific means for being able to change data transmission protocol at the level of the nodes 311 and 31n.

Figure 2:
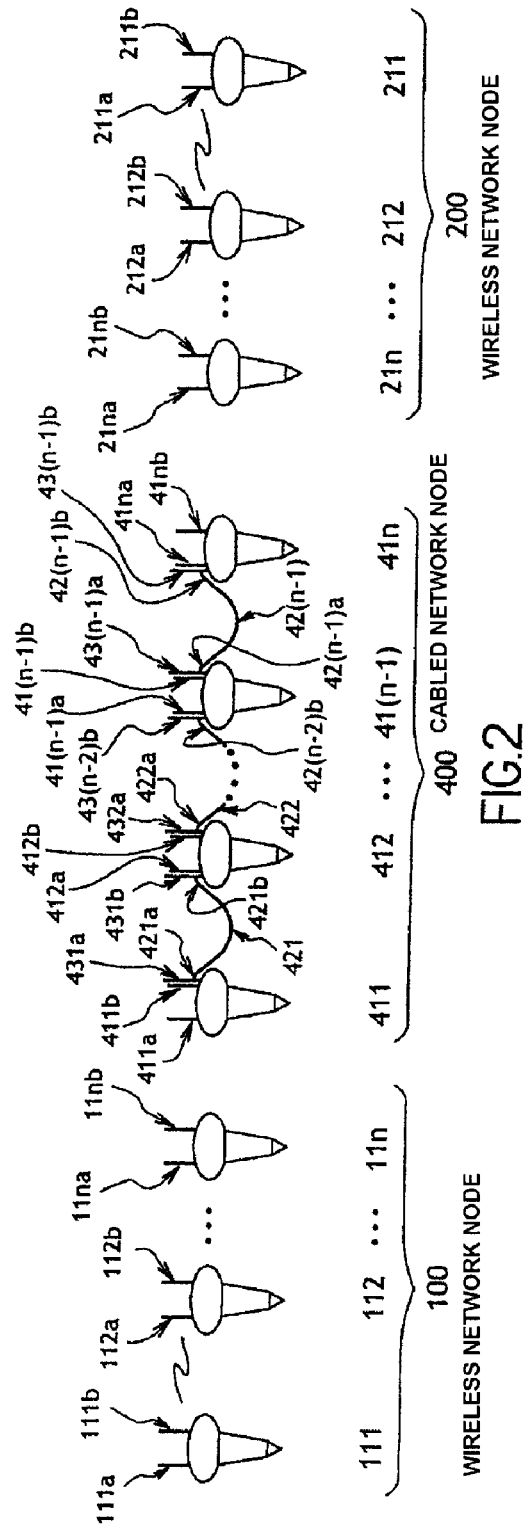
FIG. 2 shows a data acquisition network in accordance with the present invention according to a preferred embodiment of the invention.

FIG. 2 shows a data acquisition network in accordance with the present invention and realized according to a preferred embodiment. The data acquisition network is formed by an assembly of nodes comprising at least one wireless network of nodes 100, 200 and at least one cabled network of nodes 400. The cabled network of nodes 400 is formed of an assembly of nodes 411, 412, . . . , 41(n-1), 41n disposed successively and linked together in pairs by cables 421, 422, . . . , 42(n-1) respectively.

The end nodes of the cabled network of nodes 400, namely the nodes 411 and 41n, serve as relays for the data transmitted respectively between this cabled network of nodes 400 and, on the one hand, the wireless network of nodes 100 and, on the other hand, the wireless network of nodes 200. These nodes 411 and 41n each comprise two antennas (411a, 411b) and (41na, 41nb) respectively, and each comprise at least one means of fixing able to receive a cable end, 421a and 42(n-1)b respectively. These nodes 411 and 41n are in accordance with the nodes used in the wireless networks of nodes 100 and 200, except for the difference that they comprise, moreover, a means of fixing able to receive a cable end.

The nodes 412, . . . , 41(n-1) of the cabled network of nodes 400 are respectively formed on the basis of a node comprising at least two antennas (412a, 412b), . . . , (41(n-1)a, 41(n-1)b) and also comprising at least two means of fixing able to receive cable ends (421b, 422a), . . . , (42(n-2)b, 42(n-1)a).

Each cable 421, 422, . . . , 42(n-1) linking pairwise the successive nodes 411, 412, . . . , 41n of the cabled network of nodes 400 comprise at their respective ends an antenna (431a, 431b), 432a, . . . , 43(n-2)b, (43(n-1)a, 43(n-1)b), said antennas 431a, 431b, 432a, 43(n-2)b, 43(n-1)a, 43(n-1)b being fixed by way of the ends of the cables 421, 422, . . ., 42(n-1) to the nodes 411, 412, . . . , 41n. According to this embodiment, the transmission of the data within the cabled network of nodes is therefore performed in part by an electromagnetic coupling between the antennas 411b and 431a, the antennas 431b and 412a, . . . , and so on and so forth up to antennas 43(n-1)b and 41na.

The cables 321, 322, ..., 32(n-1) and 421, 422, 42(n-1) employed are waveguides. Preferably, coaxial cables will be used.

Figure 3:
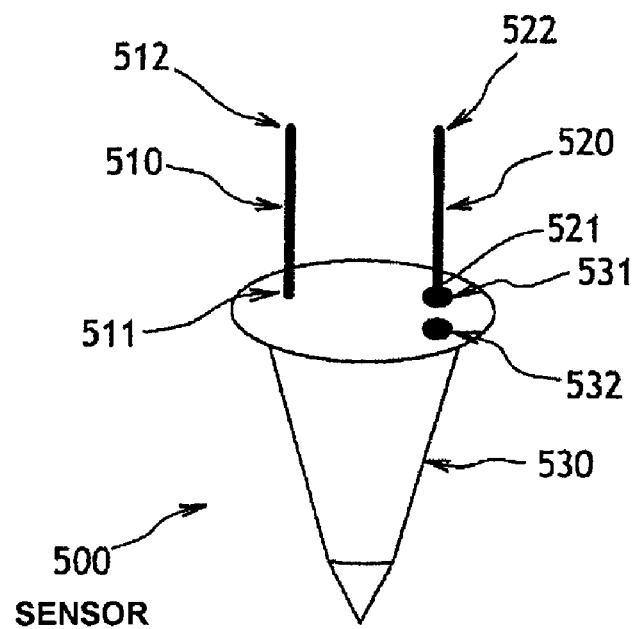
FIG. 3 shows a sensor intended to form a node of a data acquisition network in accordance with that of FIG. 1 or of FIG. 2.

FIG. 3 shows a sensor intended to form a node of a data acquisition network in accordance with that of FIGS. 1 or 2. This sensor 500 comprises a body 530, at least two antennas 510, 520, of which one at least of these two antennas is removable and fixed on a means of fixing 531 within the body 530, from which it can be disengaged.

This sensor 500 also provides at least one means of fixing 532 within the body 530 and disposed in proximity to the base of one of the antennas 510, 520. The means of fixing 532 is intended to receive a cable of type 421, 422, ..., 42(n-1), described in support of FIG. 2, and comprising, at each of its ends, an antenna (431a, 431b), 432a, ..., (43(n-1)a, 43(n-1)b).

The proximity of the means of fixing 531 and 532 therefore makes it possible in actual fact to effect an electromagnetic coupling between the antennas so as to transmit data between one of said at least two antennas 510, 520 and an antenna disposed at the end of a cable of type 421, 422, ..., 42(n-1).

Figure 4:
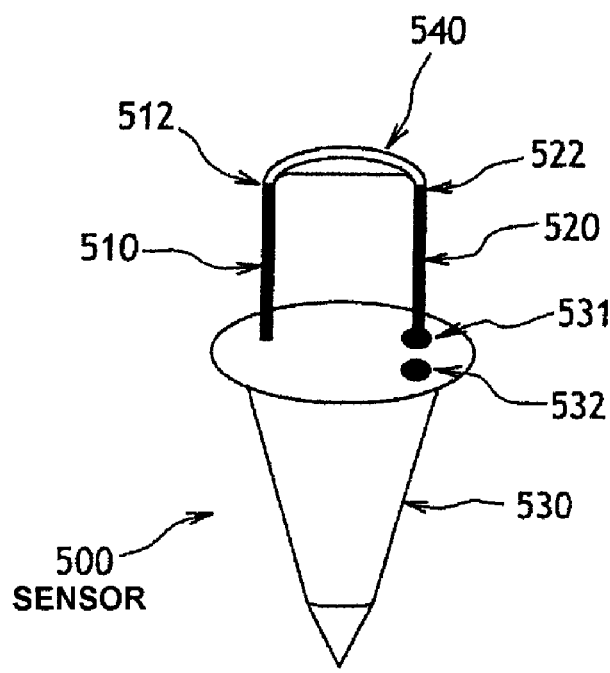
FIG. 4 shows a variant embodiment of a sensor in accordance with that of FIG. 3.

FIG. 4 shows a variant embodiment of a sensor in accordance with the sensor presented in FIG. 3. In this variant, the sensor 500 comprises, moreover, a handle 540 fixed to means of fixing (not represented) situated at the distal ends 521 and 522 of the antennas 510 and 520 respectively. This handle 540 exhibits numerous advantages. Among these advantages, manual transport of the node, manual erecting/dismantling of the node, ease of deployment and of recovery by mechanical means of said nodes, and also ease of storage by suspension. The presence of this handle between the antennas 510, 520 also improves the mechanical efficacity of these antennas.

The handle 540 may be equipped with a magnetic coil adapted to receive the energy of a charger of an induction battery external to the node. The battery (not represented) of the node may thus be recharged without contact envisaged for this purpose. Alternatively, the handle 540 may be fitted with contacts so as to recharge the battery of the node with a charger which is external to the node and moreover entirely traditional.

The present invention is not limited to the embodiment described hereinabove and extends to any embodiment in accordance with the spirit thereof.

In particular and preferably, all the nodes implemented are formed on the basis of an identical node, requiring a single mode of manufacture. According to this mode of manufacture, a node out of the nodes 111, 112, ..., 11n, 211, 212, ..., 21n, 311, 312, ..., 31n, 411, 412, ..., 41n is formed on the basis of a node comprising two removable antennas and furthermore comprising two cable end fixing means disposed on the body 530 of the sensor 500, so as to be usable interchangeably on-site.

Within the framework of the present invention, it is understood that it is entirely conceivable to use a node of type 311, 31n with nodes of type 412, ..., 41(n-1). In this case, it is necessary to use specific cables having an antenna at one of their ends, the other end comprising no antenna. It is understood that it is also conceivable to use nodes of type 411, 41n with nodes of type 312, ..., 31(n-1). Here again, certain cables linking two successive nodes of the cabled network of nodes must comprise an antenna at one of their ends, the other end of the cable comprising no antenna. Finally, and in a general manner, it is understood that it is entirely conceivable to use interchangeably a cluster, to form the cabled node network, of nodes from among the various types of nodes described hereinabove, namely the nodes 311, 312, ..., 31(n-1), 31n, 411, 412, ..., 41(n-1), 41n.

The invention claimed is:

1. A data acquisition network, comprising:
at least one first wireless network of seismic sensors having a radio-type data transmission protocol, wherein each seismic sensor of the first wireless network has sends and receives data by wireless link by radio waves having the radio-type data transmission protocol, wherein two neighboring seismic sensors of the first wireless network transmit data between them which are conveyed by the radio waves having the radio-type data transmission protocol,
at least second network of seismic sensors having the radio-type data transmission protocol, wherein each seismic sensor of the second network has sends and receives data also conveyed by radio waves having the radio-type data transmission protocol by cable, wherein two neighboring seismic sensors of the second network transmit data between them by radio waves having the radio-type data transmission protocol by means of a cable, wherein the at least second network forms a cabled network of seismic sensors,
wherein the second cabled network comprises a seismic sensor comprising means to send and receive data by a wireless link and by a cable link using both radio waves having the radio-type data transmission protocol for performing a relay transmitting the data by the radio waves having the radio-type data transmission protocol between the second cabled network and the first wireless network,
wherein the first wireless network of seismic sensors and the second cabled network of seismic sensors have the same radio-type data transmission protocol;
wherein the radio waves of the first wireless network are the same as the radio waves of the second cabled network.

2. The data acquisition network according to claim 1, wherein the data comprise data acquired at each of the seismic sensors.

3. The data acquisition network according to claim 1, wherein each of the seismic sensors of the at least one second network of seismic sensors comprises at least two antennas.

4. The data acquisition network according to claim 1, wherein the seismic sensor performing a relay is formed on the basis of a seismic sensor comprising at least two antennas and of which one at least of these antennas, which is removable, is mounted on a means of fixing able to receive a cable end.

5. The data acquisition network according to claim 4, wherein the seismic sensor performing a relay is situated respectively at one of the ends of the second cabled network of seismic sensors.

6. The data acquisition network according to claim 1, wherein the seismic sensors of the second cabled network of nodes (300) are formed on the basis of a seismic sensor comprising at least two antennas and of which two at least of these antennas, which are removable, are mounted on means of fixing able to receive cable ends.

7. The data acquisition network according to claim 1, wherein the seismic sensor performing a relay is formed on the basis of a seismic sensor comprising at least two antennas and at least one means of fixing able to receive a cable end.

8. The data acquisition network according to claim 7, wherein the seismic sensor performing a relay is situated respectively at one of the ends of the second cabled network of seismic sensors.

9. The data acquisition network according to claim 1, wherein the seismic sensors of the cabled network of seismic sensors are formed on the basis of a seismic sensor comprising at least two antennas and at least two means of fixing able to receive two cable ends.

10. The data acquisition network according to claim 3, wherein the cable linking two successive seismic sensors of the second network of seismic sensors comprises an antenna at each of its ends, so as to perform an electromagnetic coupling with the antennas of the second network of seismic sensors.

11. The data acquisition network according to claim 10, wherein each cable end is fixed to a means of fixing able to receive a cable end of a seismic sensor of the cabled network of seismic sensors.

12. The data acquisition network according to claim 1, wherein the cabled network of seismic sensors is formed by a cluster from among the various types of seismic sensors selected from the group consisting of:
  seismic sensors each formed on the basis of a seismic sensor comprising at least two antennas and of which one at least of these antennas, which is removable, is mounted on a means of fixing able to receive a cable end,
  seismic sensors each formed on the basis of a seismic sensor comprising at least two antennas and of which two at least of these antennas, which are removable, are mounted on respective means of fixing able to receive cable ends,
  seismic sensors each formed on the basis of a seismic sensor comprising at least two antennas and at least one means of fixing able to receive a cable end comprising an antenna, and
  seismic sensors each formed on the basis of a seismic sensor comprising at least two antennas and at least two means of fixing able to receive two cable ends each comprising an antenna.

13. The data acquisition network according to claim 1, wherein the cable linking two neighboring seismic sensors of the second cabled network of seismic sensors is a waveguide.

14. The data acquisition network according to claim 1, wherein the cable linking two neighboring seismic 1 of the second cabled network of seismic sensors is a coaxial cable.

15. The seismic sensor of a data acquisition network according to claim 1, comprising at least two antennas mounted on a body of which one at least of these antennas is mounted in a removable manner on a means of fixing made within the body, at least one means of fixing of a cable end, made within the body and disposed in proximity to the base of one of said at least two antennas, means for sending and receiving data by radio waves having a same radio-type data transmission protocol through both means of fixing.

16. The seismic sensor according to claim 15, wherein two antennas out of said at least two antennas comprise at their respective distal ends, means of fixing of a handle mechanically linking the two antennas.

17. The seismic sensor according to claim 16, wherein the handle comprises a magnetic coil so as to receive energy originating from an external induction battery charger.

18. The seismic sensor according to claim 16, wherein the handle comprises electrical contacts able to be connected to an external charger.

19. A method for acquiring data, comprising
  assembling at least one first wireless network of seismic sensors having a radio-type data transmission protocol, wherein each seismic sensor of the first wireless network has sends and receives data by wireless link by radio waves having the radio-type data transmission protocol,
  assembling at least second network of seismic sensors having the radio-type data transmission protocol, wherein each seismic sensor of the second network has sends and receives data also conveyed by radio waves having the radio-type data transmission protocol by cable,
  wherein a seismic sensor comprising means to send and receive data by a wireless link and by a cable link using both radio waves having the radio-type data transmission protocol for performing a relay transmitting data by the radio waves having the radio-type data transmission protocol between the second cabled network and the first wireless network is provided in the second cabled network,
  wherein radio waves on the first wireless network are the same as radio waves on the second cabled network,
  transmitting data in a wireless manner and by radio waves having the radio-type data transmission protocol between two neighboring seismic sensors of the first wireless network,
  transmitting data by a cable and by radio waves having the radio-type data transmission protocol between two neighboring seismic sensors of the second network,
  wherein the at least second network forms a cabled network of seismic sensors,
  wherein the first wireless network of seismic sensors and the second cabled network of seismic sensors have the same radio-type data transmission protocol.

20. The method for acquiring data according to claim 19, wherein the data comprise data acquired at the level of each of the seismic sensors.

* * * * *